(12) United States Patent
Kitamura et al.

(10) Patent No.: US 7,284,892 B2
(45) Date of Patent: Oct. 23, 2007

(54) SPREAD ILLUMINATING APPARATUS HAVING LIGHT COVERGING MEANS

(75) Inventors: Atsushi Kitamura, Iwata-gun (JP); Shingo Suzuki, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 227 days.

(21) Appl. No.: 10/760,587

(22) Filed: Jan. 21, 2004

(65) Prior Publication Data

US 2004/0165371 A1 Aug. 26, 2004

(30) Foreign Application Priority Data

Feb. 21, 2003 (JP) .............................. 2003-044371

(51) Int. Cl.
*F21V 7/04* (2006.01)
(52) U.S. Cl. ..................... 362/622; 26/27; 26/555; 26/559; 26/610; 26/621; 385/901
(58) Field of Classification Search .............. 362/26, 362/27, 555, 559, 621, 622, 610; 385/901
See application file for complete search history.

(56) References Cited

U.S. PATENT DOCUMENTS 6,371,623 B1* 4/2002 Toyoda ...................... 362/608

2002/0135560 A1* 9/2002 Akaoka ...................... 345/156
2003/0117792 A1* 6/2003 Kunimochi et al. .......... 362/31
2004/0130880 A1* 7/2004 Min et al. .................... 362/31

FOREIGN PATENT DOCUMENTS

| JP | 07-225301 | 8/1995 |
| JP | 07-318934 | 12/1995 |
| JP | 10-020239 | 1/1998 |
| JP | 11-202799 | 7/1999 |

* cited by examiner

*Primary Examiner*—Stephen F Husar
*Assistant Examiner*—Meghan K. Dunwiddie
(74) *Attorney, Agent, or Firm*—Oliff & Berridge, PLC

(57) ABSTRACT

A spread illuminating apparatus includes a light converging element which has a refractive index profile in a direction orthogonal to two major surfaces of a light conductive plate, and which is disposed between at least one light source and one end surface of the light conductive plate. The light converging element comprises: a plurality of transparent resin films which have respective refractive indexes so as to constitute a refractive index gradation mirror-imaged with respect to the center plane of the light converging element, and which are layered over one another; and a plurality of light-transmittable adhesive layers each of which is sandwiched between two adjacent transparent resin films.

9 Claims, 8 Drawing Sheets

SPREAD ILLUMINATING APPARATUS HAVING LIGHT COVERGING MEANS

BACKGROUND OF THE INVENTION

1. Field of the Invention

The present invention relates to a spread illuminating apparatus for use with a liquid crystal display device, and more specifically to a spread illuminating apparatus equipped with a means for increasing utilization efficiency of light emitted from a light source.

2. Description of the Related Art

A spread illuminating apparatus of side light type, in which at least one light source is disposed at an end surface of a light conductive plate, is heavily used as a subsidiary illuminating apparatus for a liquid crystal display (LCD) device. A bar-like lamp as a light source, which has a length substantially equal to the longitudinal dimension of an end surface of a light conductive plate, is disposed at the end surface in order to illuminate the light conductive plate entirely in a uniform manner.

In an electronic device, such as a portable telephone, which demands downsizing and lower power consumption, a light emitting diode (LED) is used as a light source to meet the demand. However, since the LED is a spot-like lamp, a plurality of LED's have to be disposed at an end surface of a light conductive plate in order to illuminate the light conductive plate entirely in a uniform manner. Meanwhile, FIG. 8 shows a spread illuminating apparatus (refer to Japanese Patent Application Laid-Open No. H10-199316) which is adapted to illuminate a light conductive plate entirely in a uniform manner by means of only one LED. As shown in FIG. 8, a light conductive plate 2 has an optical pattern 2D formed at a part of an end surface 2C thereof. The optical pattern 2D is composed of, for example, a prism array, and an LED 1 is disposed in front of the optical pattern 2D. Light emitted from the LED 1 is scattered at the optical pattern 2D thereby producing lights f1 in addition to lights f0 traveling straightforward. The lights f1 contribute to increasing brightness at the proximal corners of the light conductive plate.

Under the circumstances, in a spread illuminating apparatus for an electronic device, such as a portable telephone, enhanced brightness is also strongly demanded while reduced power consumption is demanded as mentioned above, and therefore it is desired that light emitted from an LED or LED's be used more efficiently. In the spread illuminating apparatus shown in FIG. 8, however, light emitted from the LED 1 is not fully used. Specifically, as shown in FIG. 6A, some of lights PR, which are emitted from an LED 1 in directions forming a large angle with respect to major surfaces of the light conductive plate 2, are not duly introduced into the light conductive plate 2 or even fail to fall incident on an end surface 2C of the light conductive plate 2 because of an open space present between the LED 1 and the light conductive plate 2, and are just wasted. This happens not only in connection with use of an LED but also a fluorescent lamp or a light conductive bar. Referring now to FIG. 6B, a transparent adhesive is filled between the LED1 and the light conductive plate 2 to thereby inhibit reflection loss (coupling loss) conventionally incurred due to the presence of the open space. Here, lights PR have their traveling directions changed to some degree due to the refractive index of the adhesive filled, but not much effectively, so there are still some lights not introduced in the light conductive plate 2, and utilization efficiency of light emitted from the LED 1 remains poor therefore hampering enhancement in brightness as well as reduction in power consumption.

In connection with FIG. 6B, a light converging element, for example, a well-known SELFOC (registered trademark) lens, which has a column shape and has a graded refractive index profile in a radial direction, may be disposed in place of the adhesive at the open space between the LED 1 and the light conductive plate 2. The aforementioned SELFOC lens is formed of a glass base material having a columnar configuration, and is utilized for optical communication, optical measurement instrument, optical information processing, and the like. However, the SELFOC lens focuses light entirely toward its optical axis, and is not adapted to converge light only in a particular direction, for example, vertically as shown by Y in FIGS. 6A and 6B.

A cylindrical lens is another well-known light converging element, which is formed of a glass base material, is shaped in a cylindrical configuration, and which has a uniform refractive index profile. The cylindrical lens has light falling incident on its circumferential surface and can converge light only in a particular direction, for example, vertically in FIGS. 6A and 6B. But, the cylindrical lens has a uniform refractive index profile as described above, and therefore does not provide a good convergence characteristic. Further, since the cylindrical lens has an aced incidence surface so as to converge diffused light in a parallel manner, an open space still remains toward the LED 1 thus generating reflection loss. In order to eliminate the reflection loss, a transparent adhesive or resin may be filled between the LED 1 and the cylindrical lens. This, however, results in that the refractive index of the cylindrical lens is defined as relative to the refractive index of the filled adhesive or resin therefore significantly deteriorating the converging performance of the cylindrical lens. A cylindrical lens having a thickness of 1 to 2 mm and formed of glass having a high refractive index may duly work, but to produce such a cylindrical lens is difficult or prohibitive in view of physical strength, manufacturing technology and production cost. On the other hand, a cylindrical lens formed of synthetic resin does not achieve required performance because the synthetic resin has a lower refractive index than the glass therefore lowering its convergence factor.

Referring to FIG. 7, a light conductive plate 2 is dimensioned to define a major surface having a larger area than a display screen size of an LCD device (not shown) arranged over the light conductive plate 2, on the grounds that a so-called dead area 2A exists inherently toward an end of the light conductive plate 2 provided with LED's 1, where light emission from the LED's 1 is not uniform. In case of a small device, such as a portable telephone, the dead area 2A, which is not usable, has its length Ld usually measuring 2 to 4 mm from the end with the LED's 1. The dead area 2A is covered up to prevent light from exiting out to be wasted and therefore is of no use thus only hampering downsizing of the device.

SUMMARY OF THE INVENTION

The present invention has been made in the light of the above problem, and it is an object of the present invention to provide a spread illuminating apparatus, in which light, that is emitted from a light source in directions forming a large angle with respect to major surfaces of a light conductive plate and that is not effectively utilized conventionally, is converged, while passing through an area conventionally called "dead area", only in a direction orthogonal to the major surfaces of the light conductive plate, whereby the light from the light source is fully and effectively utilized for a brighter illumination with a same power consumption, and at the same time downsizing can be achieved.

In order to achieve the object described above, according to one aspect of the present invention, a spread illuminating apparatus comprises: at least one light source; a light conductive plate which has the at least one light source disposed so as to face toward one end surface thereof, and which allows light emitted from the at least one light source and introduced thereinto to exit out from at least one of two major surfaces thereof respectively toward at least one object to be illuminated; and a light converging means which has a refractive index profile in a direction orthogonal to the two major surfaces of the light conductive plate, and which is disposed between the at least one light source and the one end surface of the light conductive plate.

In the aspect of the present invention, the refractive index profile of the light converging means may be structured symmetric about a center plane of the light converging means such that a refractive index decreases with an increase in distance from the center plane.

In the aspect of the present invention, the light converging means may have a height substantially equal to a thickness of the light conductive plate toward the one end surface.

In the aspect of the present invention, the light converging means may have its light entrance surface and its light exit surface oriented parallel to each other.

In the aspect of the present invention, the light converging means may have the light entrance surface and the light exit surface bonded respectively to the at least one light source and the one end surface of the light conductive plate by means of an adhesive which transmits the light emitted from the at least one light source.

In the aspect of the present invention, the light converging means comprises a plurality of transparent films which have respective refractive indexes and which are layered over one another, and a plurality of light-transmittable adhesive layers each of which is sandwiched between two adjacent transparent films.

In the aspect of the present invention, the plurality of the transparent films of the light converging means may be provided in an odd number.

In the aspect of the present invention, each of the adhesive layers has a refractive index at least equal to a refractive index of one of the two adjacent transparent films having a smaller refractive index, and has a refractive index at most equal to a refractive index of the other of the two adjacent transparent films having a larger refractive index.

In the aspect of the present invention, the plurality of transparent films may be formed of resin or glass.

Accordingly, light emitted from the light source in a direction forming a large angle with respect to the major surface of the light conductive plate can be converged while traveling through the light converging means, whereby the light can be fully and effectively utilized thus achieving a brighter illumination with the same level of power consumption.

Also, the light converging means can be dimensioned smaller than the conventionally called "dead area", and this contributes to downsizing the apparatus while achieving an increased brightness as mentioned above.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 7:
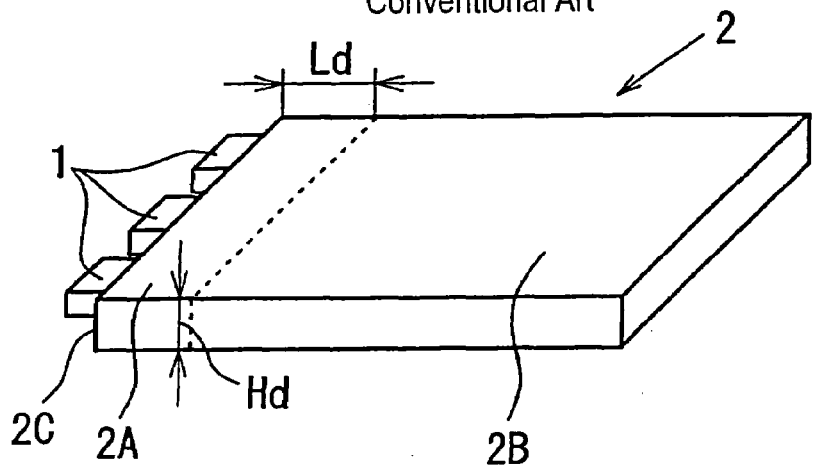
FIG. 7 is an explanatory perspective view of a conventional spread illuminating apparatus using spot-like light sources.
Figure 8:
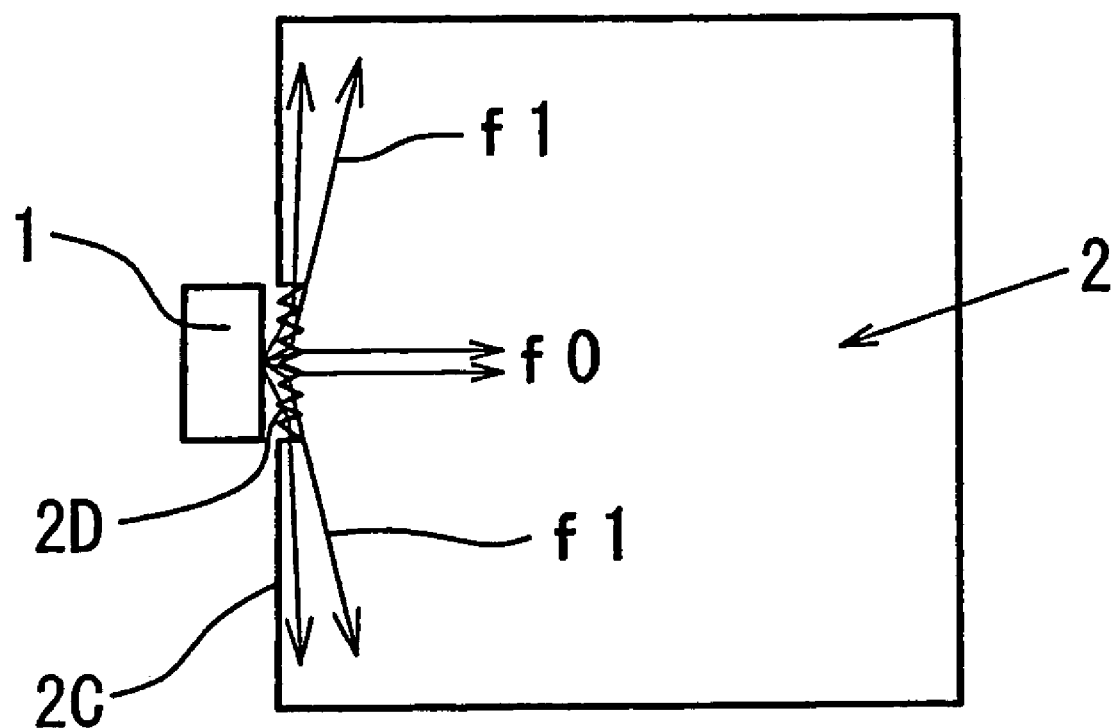
FIG. 8 is an explanatory top plan view of another conventional spread illuminating apparatus with a light conductive plate having, at its one end, an optical pattern to diffuse light in horizontal directions.

A preferred embodiment of the present invention will be described with reference to FIGS. 1, and 2A to 2D, together with FIG. 7 as appropriate.

Figure 1:
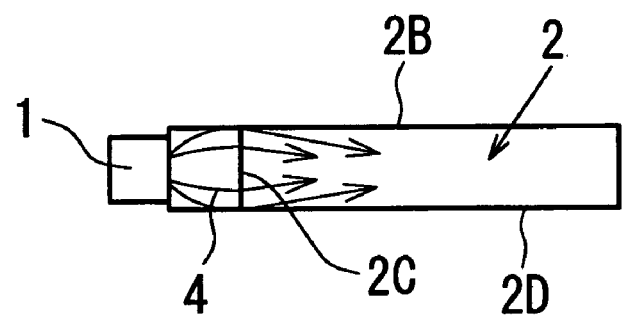
FIG. 1 is an explanatory side view of a spread illuminating apparatus according to an embodiment of the present invention.
Figure 2A:
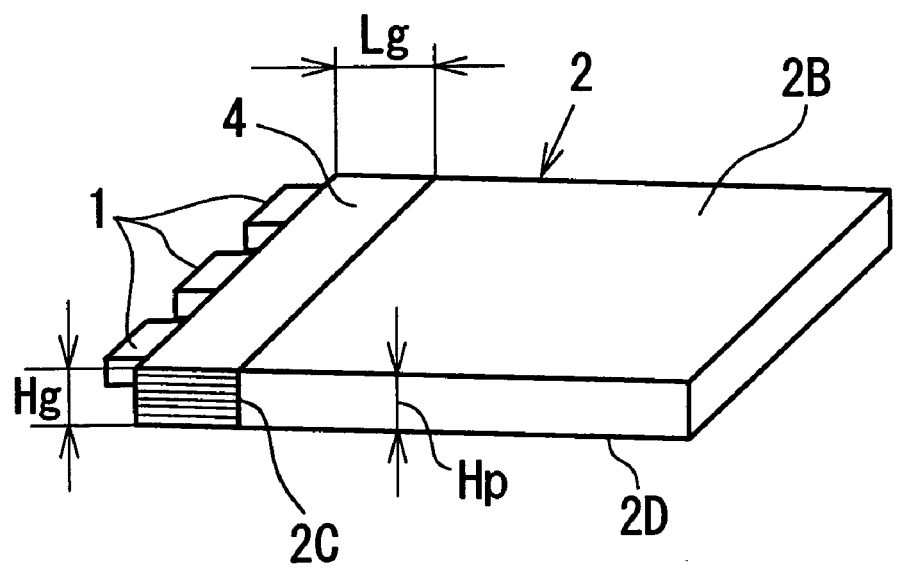
FIG. 2A is a perspective view of the spread illuminating apparatus of FIG. 1.

Referring to FIGS. 1 and 2A, a spread illuminating apparatus of the present invention comprises a light conductive plate 2, a plurality (three in the embodiment) of LED's 1 as light sources, and a light converging element 4 as light converging means. The light converging element 4 is disposed between the LED's 1 and the light conductive plate 2 so as to occupy an area corresponding to the dead area 2A present in the conventional spread illuminating apparatus shown in FIG. 7. The light converging element 4 has a graded refractive index profile in a direction orthogonal to one major surface (light exit surface) 2B of the light conductive plate 2. The light conductive plate 2 is described as having a constant thickness, that is to say the light exit surface 2B is parallel to another major surface (bottom surface) 2D, in the ensuing discussion, but may alternatively be structured to have a wedge-shaped cross section. Also, the light conductive plate 2 may have a light scattering/diffusing means formed on the light exit surface 2B and the bottom surface 2D. Such a light scattering/diffusing means is described, for example, in connection with a spread illuminating apparatus disclosed in Japanese Patent Application Laid-Open No. H09-63332, and a detailed explanation thereof is omitted here.

The light converging element 4 has a height Hg substantially equal to a thickness Hp of the light conductive plate 2, and a predetermined length Lg as shown in FIG. 2A, and has a refractive index profile as described above (in a direction shown by Y in FIG. 2B). As described in details later, the light converging element 4 comprises a plurality of transparent resin films which are layered (in a vertical direction in the figure) over one another and which are fixed together with one another by means of adhesive. The resin films and adhesive are made of material (to be described later), through which light emitted from the LED's 1 can transmit.

Figure 2B:
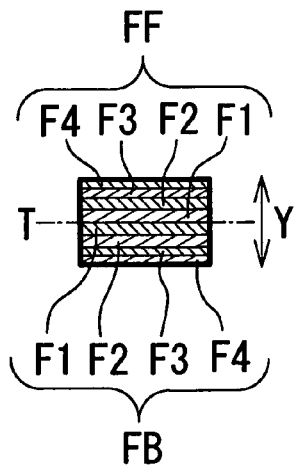
FIG. 2B is a schematic cross sectional view of a light converging element in the spread illuminating apparatus of FIG. 2A.
Figure 2C:
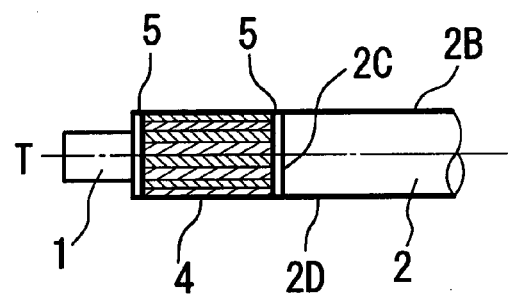
FIG. 2C is an explanatory view of coupling the light converging element between LED's and a light conductive plate in the spread illuminating apparatus of FIG. 2A.

Referring to FIG. 2B, the light converging element 4 is composed of two segments FF and FB, each of which comprises a plurality (four in the figure) of transparent resin films F1 to F4 layered over one another outwardly in this order, and the two segments FF and FB are disposed respectively toward the light exit surface 2B and the bottom surface 2D of the light conductive plate 2 with their respective innermost films F1 adhesively attached to each other so as to form a structure symmetric about a center plane T. The resin films F1 to F4 are adhesively fixed with one another. As described hereinafter, the resin films F1 to F4 have respective different refractive indexes n, and the two segments FF and FB are each structured such that the refractive index n decreases with an increase in distance from the center plane T. The light converging element 4 thus structured and disposed between the LED's 1 and the light conductive plate 2 are fixed thereto by means of adhesive 5 as shown in FIG. 2C.

The LED's 1 are disposed with a predetermined interval in a line parallel to an end surface 2C of the light conductive plate 2. The interval is determined such that the entire surface of a liquid crystal display (not shown) can be illuminated in a uniform manner by light emitted from the LED's 1.

Figure 2D:
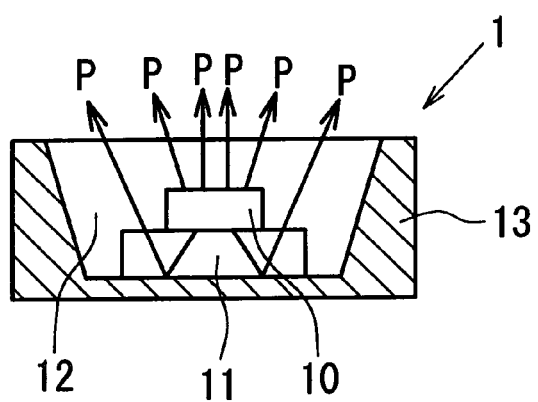
FIG. 2D is a schematic cross sectional view of one LED in the spread illuminating apparatus of FIG. 2A.

The LED's 1 are each structured, for example, such that an InGaN blue LED chip 10 placed on a transparent base 11 is put in a case 13 and entirely covered up by YAG fluorescent material 12 as shown in FIG. 2D. Blue light emitted from the blue LED chip 10 mixes with yellow light emitted from the YAG fluorescent material 12 excited by the blue LED chip 10, whereby white light P is emitted. The LED 1 may alternatively comprise, for example, an InGaN ultraviolet LED chip and white fluorescent material so as to emit white light.

Usually, the LED 1 has its light emitting surface formed substantially flat so that the light emitting surface is entirely in contact with a light entrance surface of the light converging element 4. Also, the refractive indexes of the resin films F1 to F4 and adhesive layers (to be described later) are respectively determined depending on a wave length of light emitted from the LED's 1. Also, the flat light emitting surface of the LED 1 eases manufacturing of the light converging element 4, which is described later.

Figure 3:
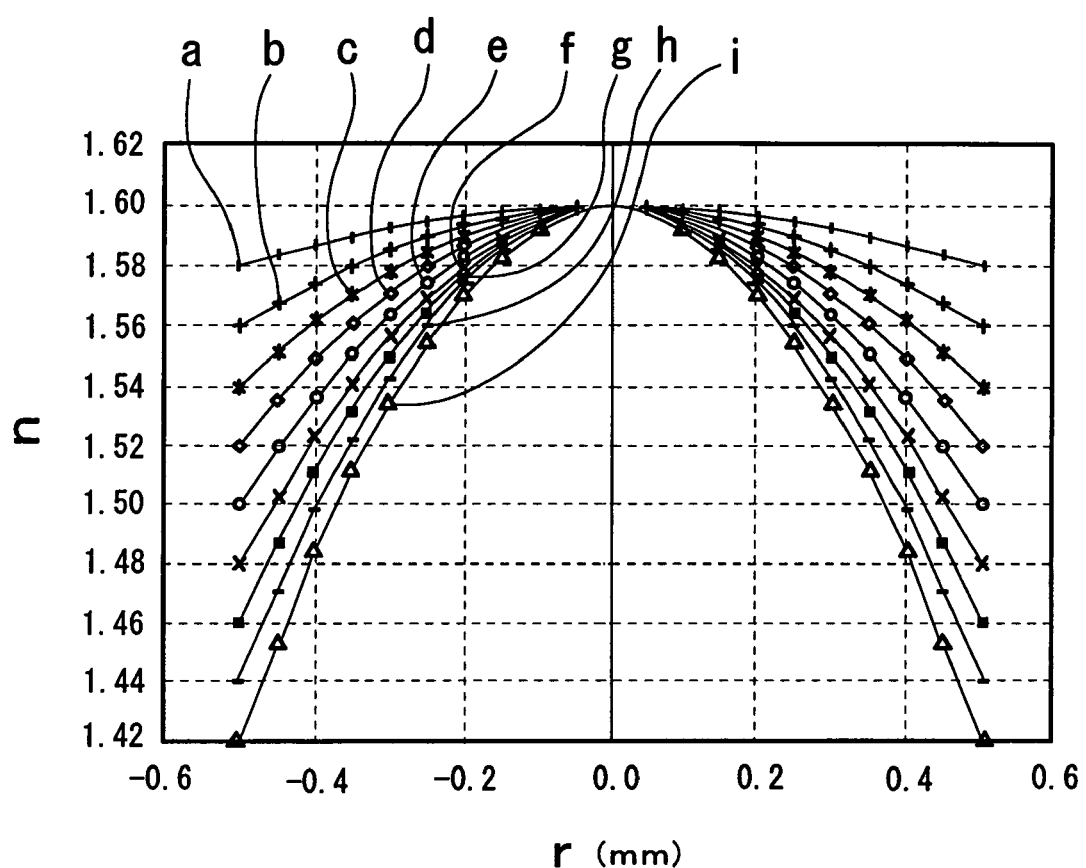
FIG. 3 is a graph of a refractive index variation of the light converging element of FIG. 2B.
Figure 4:
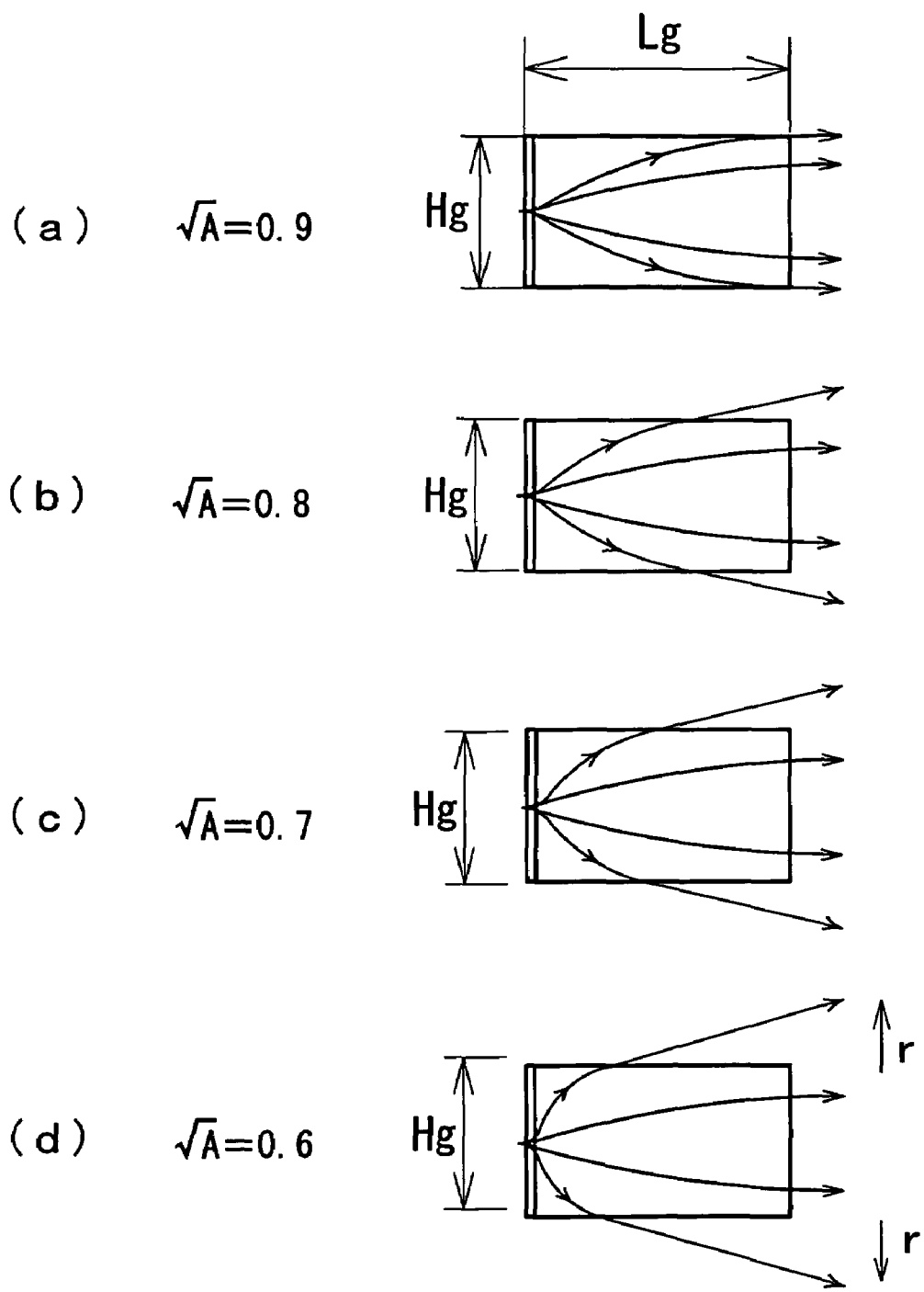
FIGS. 4A to 4D are light tacking views of the light converging element.
Figure 5A:
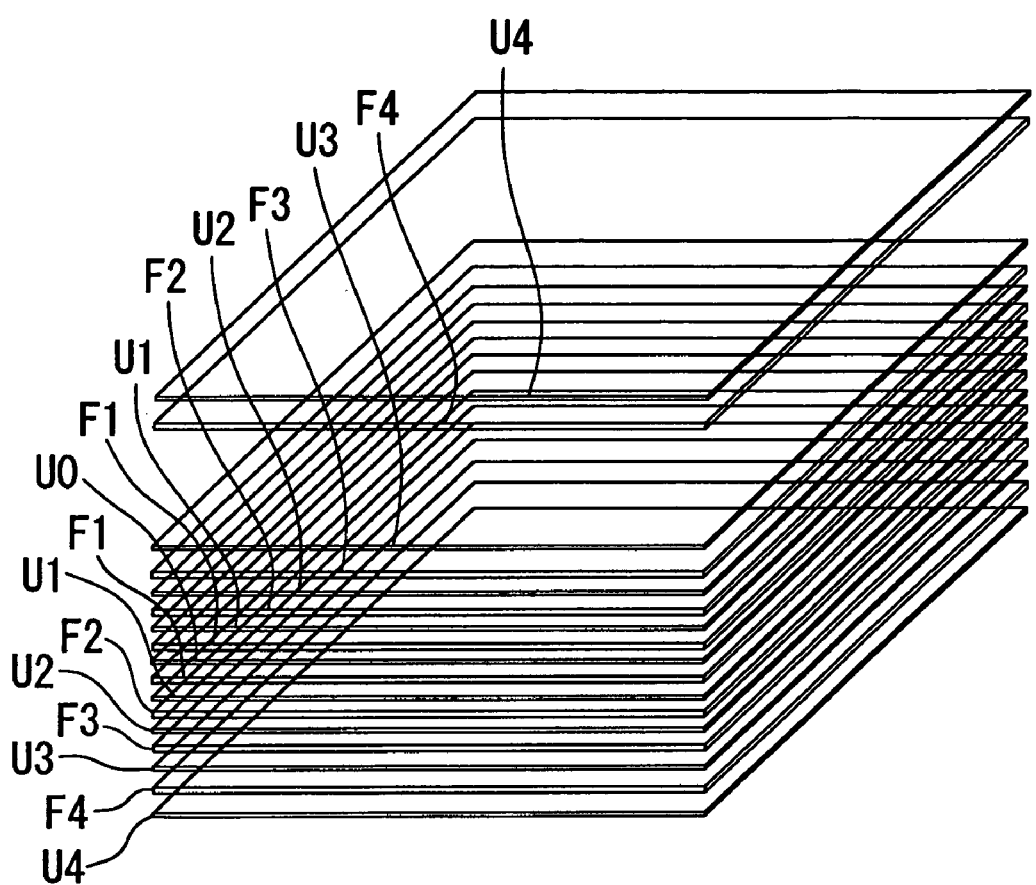
FIGS. 5A and 5B are respectively an explanatory exploded view, a perspective view of a work-in-process of the light converging element.
Figure 5B:
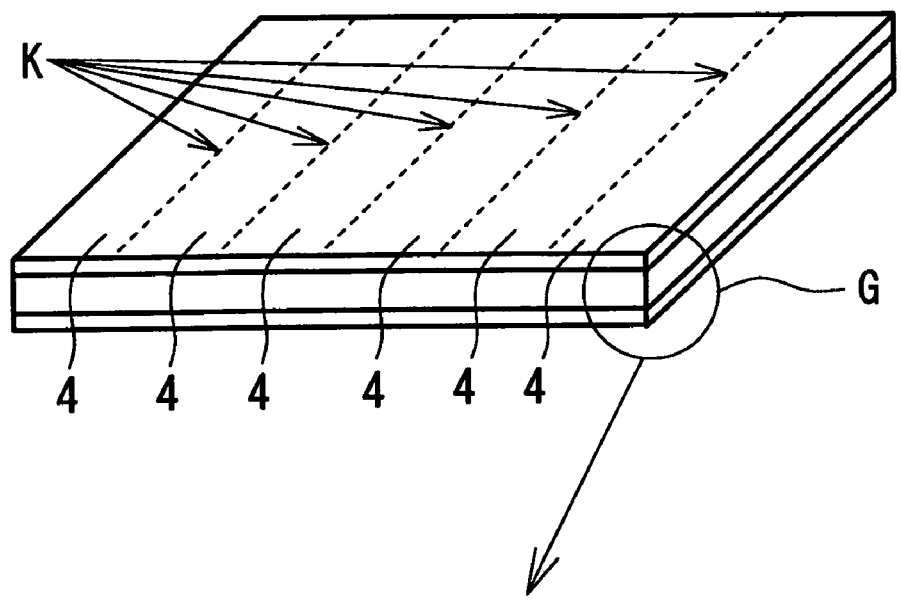

For ease of understanding the present invention, the light converging element 4 will be discussed in further details with reference to FIGS. 3, 4A to 4D, and 5A to 5C. The light converging element 4 has a symmetrically layered structure as briefly described above (refer back to FIG. 2B). The light converging element 4 is manufactured as follows. Referring to FIG. 5A, a plurality (four in the figure) of transparent resin films F1 to F4 are layered over one another outwardly in this order in both opposite directions, respectively, and are attached fixedly to one another by means of respective adhesive layers U1 to U3, and two of the segments thus processed are put together with respective innermost resin films F1 attached to each other by means of an adhesive layer U0. In this connection, another adhesive layer U4 may be placed, as required, over the outermost resin film F4 so as to strengthen the converging performance. The adhesive layer U4 is effective also in protecting the resin film F4. The embodiment of the present invention shown in FIGS. 5A and 5C includes the adhesive layer U4, but the adhesive layer U4 is not necessarily required. And, the layered structure thus processed is cut to dashed lines K as shown in FIG. 5B, thereby producing a plurality of individual light converging elements 4. The dashed lines K are set parallel to one another thus aligning a light entrance surface and a light exit surface in parallel, and the distance between two adjacent dashed lines K, which constitutes the length Lg of the light converging element 4, is set appropriately based on the value of a refractive index distribution constant $A^{1/2}$ to be described later.

The transparent resin films F1 to F4 are formed of, for example, PET (polyethylene terephthalate), ZEONOA (trademark by Nippon Zeon Co., Ltd.), norbornene refractory transparent resin ARTON (trademark by JSR C., Ltd.), PMMA (polymethylmethacrylate), and the like. And, the adhesive layers U0 to U4 are formed of, for example, acrylic UV cured optical adhesive by Norland Corp. The aforementioned resin films F1 to F4 and adhesive layers U0 to U3/4 are selectively used to meet the requirements of the light converging element 4. The transparent resin films F1 to F4 may be replaced by glass films. The cut surfaces of the glass film can be optically polished easily thus contributing to preventing scattering loss from occurring at a cut surface. Also, the glass film has an advantage in that its refractive index can be fine-adjusted by precisely controlling its composition, whereby an optimum refractive index profile can be provided ad libitum.

Figure 5C:
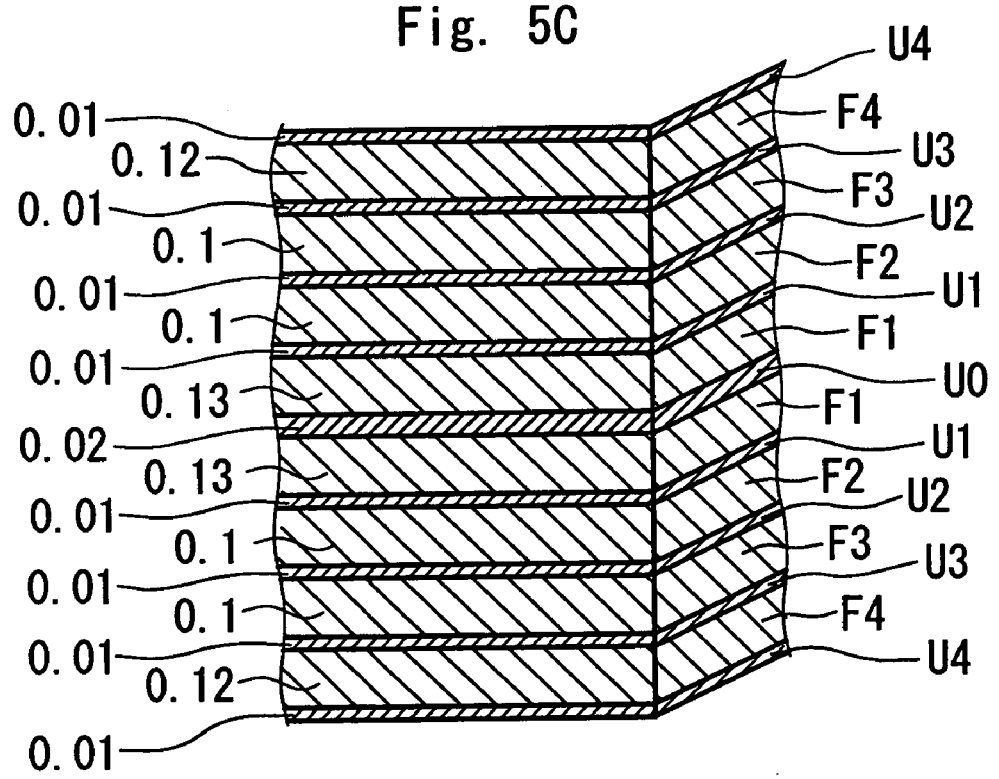
FIG. 5C is a schematic enlarged view of a portion of FIG. 5B.
Figure 6A:
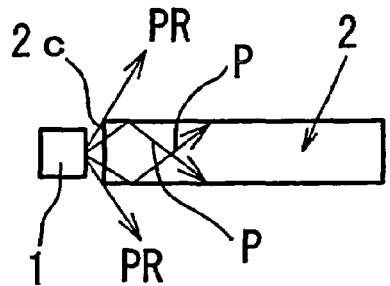
FIGS. 6A and 6B are explanatory side views of a conventional spread illuminating apparatuses.
Figure 6B:
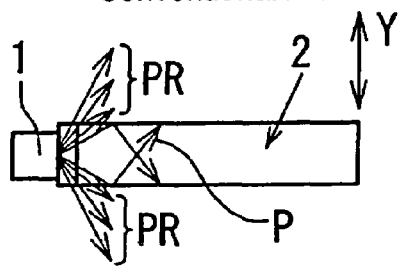

Referring to FIG. 5C, the adhesive layer U0, which is located at the center as a core layer, and which has the highest refractive index, is sandwiched between the two innermost resin films F1, F1 which have a refractive index equal to or lower than the refractive index of the adhesive layer U0, and two resin films F2, F2 are layered over respective films F1, F1 sandwiching respective adhesive layers U1, U1 which have a lower refractive index than the films F1, F1. Then, the adhesive layer U2, the resin film F3, the adhesive layer U3, and the resin film F4, which have their respective refractive indexes decreasing in this sequence, are layered on one another at each of both sides, and if required, two adhesive layers U4, U4 are layered on the films F4, F4, respectively.

The resin films F1 to F4 of the light converging element 4 will hereinafter be further discussed. Referring now to FIG. 3, the ordinate axis indicates refractive index n of the resin film and the adhesive layer while the abscissa axis indicates a distance r defined to measure from the center plane of the light converging element 4 to a relevant point (relevant rein film or adhesive layer), and parameters indicated by a to i are refractive index distribution constants $A^{1/2}$, which are set at 0.1, 0.2, 0.3, 0.4, 0.5, 0.6, 0.7, 0.8 and 0.9, respectively.

The height Hg of the light converging element 4 is determined basically to the thickness Hp (refer to FIG. 2A) of the light conductive plate 2, and the length Lg of the light converging element 4 depends on the value of a refractive index distribution constant $A^{1/2}$ and possibly also the height Hg determined as described above. In case of a light converging element (as shown in FIGS. 4A to 4D) for use in a usual portable telephone, the height Hg and the length Lg are, for example, 1.0 mm and 1.5 mm, respectively. Referring to FIG. 4A, when the light converging element 4 has a refractive index distribution constant $A^{1/2}$ of 0.9, light can be satisfactorily converged inside the light converging element 4 with a height Hg of 1.0 mm and a length Lg of 1.5 mm. Referring now to FIGS. 4B (4C, and 4D), when the light converging element 4 has a refractive index distribution constant $A^{1/2}$ of 0.8 (0.7, and 0.6, respectively), light cannot be fully converged inside the light converging element 4 dimensioned same as shown in FIG. 4A therefore requiring the height Hg and/or the length Lg to be increased. Thus, in case of the light converging element 4 having a height Hg of 1.0 mm and a length Lg of 0.5 mm as exemplified above, its refractive index distribution constant $A^{1/2}$ is preferably set at 0.9 in order to allow light to be fully converged inside the light converging element 4 so that the light can fall effectively incident on the end surface 2C of the light conductive plate 2. With this arrangement, light emitted from the LED's 1 can be effectively utilized for increased brightness while achieving a reduced longitudinal dimension for downsizing.

The resin films F1 to F4 have their respective refractive indexes n set at 1.60, 1.56, 1.50 and 1.42, and the adhesive layers U0 to U4 have their respective refractive indexes n set at 1.60, 1.56, 1.50, 1.45 and 1.42. The resin films F1 to F4 and the adhesive layers U1 to U4 have their thicknesses set as shown in FIG. 5C. The refractive index and thickness are determined as below according to a refractive index profile curve defined by the aforementioned refractive index distribution constant $A^{1/2}$=0.9.

The refractive indexes n and thicknesses t of four or five kinds of resin films (four kinds F1 to F4 in the embodiment) and five kinds of adhesive layers (U0 to U4 in the embodiment), which in combination forms a dual segment structure symmetric about the center adhesive layer U0 as shown in FIG. 5A, are determined with the refractive index n of the outermost resin film F4 and also the outermost adhesive layer U4 being set at the lowest value, such that a light converging element formed of the resin films and adhesive layers can achieve a smooth converging performance with a height Hg of about 1.0 mm. Specifically in case of the light converging element 4 having a height Hg of 1.0 mm, if the thickness of the resin film F4 is set at 0.12 mm with its refractive index n set at 1.42, and if the outermost adhesive layer U4 is set at 0.01 mm, the distance r, which is defined as measuring from the center plane (=center of the adhesive layer U0) to a relevant point of the light converging element 4, is now 0.37 mm. As known from FIG. 3, when the distance r is 0.37 mm or smaller, the refractive index n of a resin film must be 1.49 or higher. Thus, the refractive index of the resin film F3 is set at 1.50. And the refractive index n of an adhesive layer is appropriately determined according to the refractive index n of the resin film determined as described above. For example, the refractive index of the adhesive layer U3 which fixes together the resin films F4 and F3 must range between the refractive indexes of the resin films F4 and F3, specifically from 1.42 to 1.50, and thus is set at 1.45. And the thickness of the adhesive layer U3 is preferably set at about 0.01 mm in view of adhesion strength to the resin films F4 and F3 and respective refractive indexes.

The remaining resin films have their respective thicknesses set following the way described above: F3=0.10 mm, F2=0.10 mm, and F1=0.13 mm. And, the adhesive layers have their thicknesses set at 0.01 mm except U0 which has its thickness set at 0.02 mm.

If the height Hg and length Lg of the light converging element 4 are set at 1.0 mm or larger and 1.5 mm or larger, respectively, the refractive index distribution constant $A^{1/2}$ is preferably set at 0.9 or smaller. A smaller refractive index distribution constant $A^{1/2}$ provides a smaller variation in refractive index as shown in FIG. 3, but converges light to a smaller degree as explained in FIGS. 4A to 4D thus making increasingly difficult to fully and successfully converge light within a limited dimension of the light converging element 4. Thus, if the space allows the light converging element 4 to have a larger dimension, then the refractive index distribution constant $A^{1/2}$ may be set at the smallest value possible thereby providing the smallest possible variation in refractive index, which requires decreased kinds of resin films and adhesive layers resulting in a reduced cost, and which enables light to be refracted smoothly therefore producing an excellent convergence characteristic.

The light converging element 4 discussed in the embodiment comprises an even number of resin films in total as shown FIGS. 5A and 5C, but may alternatively comprise an odd number of resin films in total, wherein the light converging element 4 is structured to be symmetric about a resin film centrally located. In this case, light traveling at the center, which has the highest intensity, is suppressed from being refracted consequently achieving an improved efficiency, and the resin film of, for example, PET as a center film can be dimensioned to be thick consequently enhancing the physical strength of the light converging element 4. Also, since an adhesive having a high refractive index contains a substance that is not environmentally friendly, it is preferred that the light converging element 4 be formed of an odd number of resin films thereby refraining from using an adhesive as a center layer. Also, the light converging element 4 discussed so far is formed of a single piece for a plurality (three in the embodiment) of the LED's 1 but may alternatively be formed of a plurality of pieces in a number corresponding to the number of the LED's 1.

While the present invention has been illustrated and explained with respect to a specific embodiment thereof, it is to be understood that the present invention is by no means limited thereto. For example, the present invention is embodied by use of spot-like lamps (LED's) in order to explain efficient utilization of emitted light for bright and uniform illumination while aiming to reduce power consumption, but may be effectively applied to use of other type lamps, such as bar-shaped fluorescent lamps, for achieving light distribution characteristics required. Thus, it is apparent that various modifications, additions and other alternative embodiments are possible without departing from the true scope and spirit of the present invention, and it is intended that the scope of the present invention be defined by the following claims.

What is claimed is:
1. A spread illuminating apparatus comprising:
at least one light source;
a light conductive plate which allows light emitted from the at least one light source and introduced thereinto to exit out from at least one of two major surfaces thereof respectively toward at least one object to be illuminated; and
a light converging means, which is disposed between the at least one light source and the light conductive plate, has a refractive index profile in a direction orthogonal to the two major surfaces of the light conductive plate; wherein the refractive index profile of the light converging means is structured symmetric about a center plane of the light converging means such that a refractive index decreases with an increase in distance from the center plane.

2. A spread illuminating apparatus according to claim 1, wherein the light converging means has a height substantially equal to a thickness of the light conductive plate toward one end surface.

3. A spread illuminating apparatus according to claim 1, wherein the light converging means has its light entrance surface and its light exit surface oriented parallel to each other.

4. A spread illuminating apparatus comprising:
 at least one light source;
 a light conductive plate which allows light emitted from the at least one light source and introduced thereinto to exit out from at least one of two major surfaces thereof respectively toward at least one object to be illuminated; and
 a light converging means, which is disposed between the at least one light source and the light conductive plate, has a refractive index profile in a direction orthogonal to the two major surfaces of the light conductive plate;
 wherein the light converging means has a light entrance surface and a light exit surface bonded respectively to the at least one light source and one end surface of the light conductive plate by means of an adhesive that transmits the light emitted from the at least one light source.

5. A spread illuminating apparatus comprising:
 at least one light source;
 a light conductive plate which allows light emitted from the at least one light source and introduced thereinto to exit out from at least one of two major surfaces thereof respectively toward at least one object to be illuminated; and
 a light converging means, which is disposed between the at least one light source and the light conductive plate, has a refractive index profile in a direction orthogonal to the two major surfaces of the light conductive plate;
 wherein the light converging means comprises a plurality of transparent films that have respective refractive indexes and which are layered over one another, and a plurality of light-transmittable adhesive layers each of which is sandwiched between two adjacent transparent films.

6. A spread illuminating apparatus according to claim 5, wherein the plurality of the transparent films of the light converging means are provided in an odd number.

7. A spread illuminating apparatus according to claim 5, wherein each adhesive layer of the light converging means has a refractive index at least equal to a refractive index of one of the two adjacent transparent films having a smaller refractive index, and has a refractive index at most equal to a refractive index of the other of the two adjacent transparent films having a larger refractive index.

8. A spread illuminating apparatus according to claim 5, wherein the plurality of transparent films are formed of resin.

9. A spread illuminating apparatus according to claim 5, wherein the plurality of transparent films are formed of glass.

* * * * *

UNITED STATES PATENT AND TRADEMARK OFFICE
CERTIFICATE OF CORRECTION

PATENT NO. : 7,284,892 B2
APPLICATION NO. : 10/760587
DATED : October 23, 2007
INVENTOR(S) : Atsushi Kitamura and Fumio Suzuki Page 1 of 1

It is certified that error appears in the above-identified patent and that said Letters Patent is hereby corrected as shown below:

Title Page;
Item (54), line 2, please change "COVERGING" to --CONVERGING--.

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

PATENT NO.        : 7,284,892 B2  
APPLICATION NO. : 10/760587  
DATED             : October 23, 2007  
INVENTOR(S)       : Atsushi Kitamura and Fumio Suzuki It is certified that error appears in the above-identified patent and that said Letters Patent is hereby corrected as shown below:

Title Page;
Item (54), line 2, and Column 1, line 2, please change "COVERGING" to --CONVERGING--.

This certificate supersedes the Certificate of Correction issued April 29, 2008.

Signed and Sealed this

Twentieth Day of May, 2008

JON W. DUDAS
*Director of the United States Patent and Trademark Office*